(12) United States Patent  
Tanie et al.

(10) Patent No.: US 7,518,202 B2  
(45) Date of Patent: Apr. 14, 2009

(54) MECHANICAL QUANTITY MEASURING APPARATUS

(75) Inventors: Hisashi Tanie, Mito (JP); Takashi Sumigawa, Fukuoka (JP); Hiroyuki Ohta, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 69 days.

(21) Appl. No.: 11/349,913

(22) Filed: Feb. 9, 2006

(65) Prior Publication Data

US 2006/0216848 A1 Sep. 28, 2006

(30) Foreign Application Priority Data

Mar. 22, 2005 (JP) .............................. 2005-080835

(51) Int. Cl.
*H01L 29/84* (2006.01)
(52) U.S. Cl. .............................. 257/417; 257/E23.194
(58) Field of Classification Search .................. 257/415, 257/417, 418, 420; 73/715
See application file for complete search history.

(56) References Cited

U.S. PATENT DOCUMENTS

| | | | | |
|---|---|---|---|---|
| 5,986,316 A | * | 11/1999 | Toyoda et al. ................. 257/419 |
| 6,041,495 A | * | 3/2000 | Yoon et al. ..................... 29/841 |
| 6,313,514 B1 | * | 11/2001 | Winterer et al. .............. 257/417 |
| 6,316,734 B1 | * | 11/2001 | Yang ............................ 174/256 |
| 6,323,542 B1 | * | 11/2001 | Hashimoto ................... 257/669 |
| 6,483,160 B2 | * | 11/2002 | Engelhardt et al. ........... 257/415 |
| 6,713,880 B2 | * | 3/2004 | Sahara et al. ................ 257/783 |
| 6,809,935 B1 | * | 10/2004 | Lee .............................. 361/783 |
| 7,131,334 B2 | * | 11/2006 | Mei .............................. 73/715 |
| 7,143,650 B2 | * | 12/2006 | Mikkelsen et al. ............ 73/715 |
| 2004/0140558 A1 | * | 7/2004 | Tanaka ........................ 257/734 |
| 2005/0163966 A1 | * | 7/2005 | Chengalva et al. ........... 428/131 |

FOREIGN PATENT DOCUMENTS

JP 07-035628 2/1995
JP 09-053907 2/1997

* cited by examiner

*Primary Examiner*—Evan Pert
*Assistant Examiner*—W. Wendy Kuo
(74) *Attorney, Agent, or Firm*—Antonelli, Terry, Stout & Kraus, LLP.

(57) ABSTRACT

A semiconductor mechanical quantity measuring apparatus in which the reverse surface of a strain-detecting semiconductor element is bonded to an object of measurement, and a member having a small elastic modulus is interposed between the wiring board for supporting the strain-detecting semiconductor element and the strain-detecting semiconductor element. It then becomes possible to reduce an undesirable effect that the rigidity and thermal deformation of the wiring board have on the strain-detecting semiconductor element, while supporting the strain-detecting semiconductor element.

15 Claims, 11 Drawing Sheets

OVERALL SECTIONAL VIEW

ENLARGED SECTION VIEW OF SENSOR

ENLARGED SECTION VIEW OF SENSOR

SCHEMATIC DIAGRAM SHOWING SEMICONDUCTOR ELEMENT

OVERALL SECTIONAL VIEW

OVERALL TOP PLAN VIEW

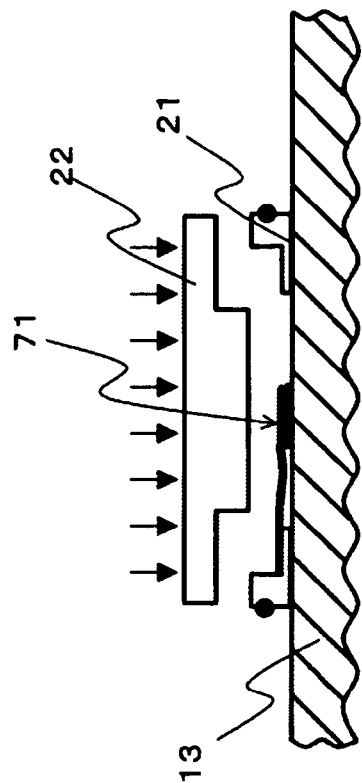
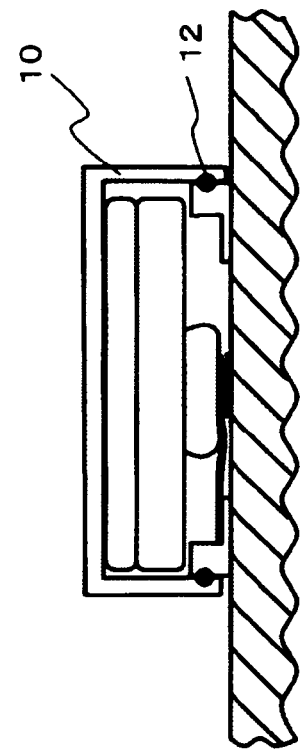
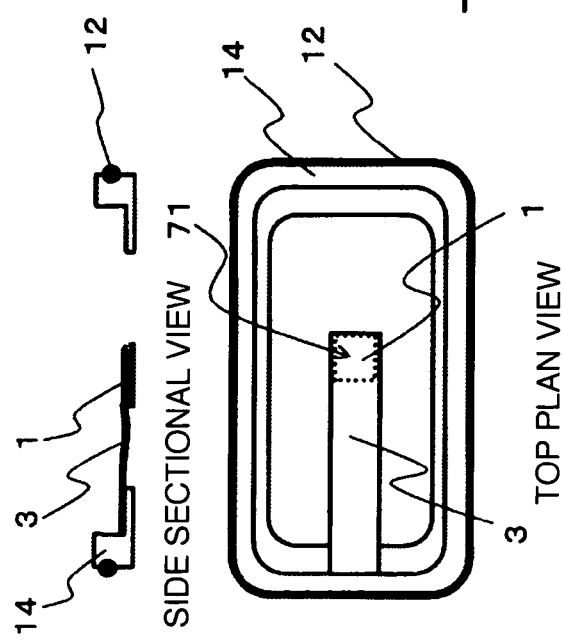
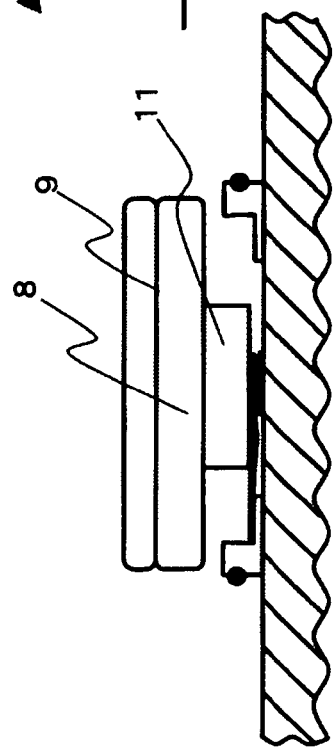

TOP PLAN VIEW OF BASE MOUNTED

ENLARGED SECTIONAL VIEW OF THE NEIGHBORHOOD OF SEMICONDUCTOR ELEMENT

ENLARGED TOP PLAN VIEW OF THE NEIGHBORHOOD OF SEMICONDUCTOR ELEMENT

MECHANICAL QUANTITY MEASURING APPARATUS

BACKGROUND OF THE INVENTION

This invention relates to a technique for mounting a semiconductor mechanical quantity measuring apparatus.

A technique for measuring the strain generated in an object of measurement has been developed using a strain gauge including a sensor having a thin tape member on which a metal foil photoetched in a grid is arranged. This strain gauge is bonded to the object of measurement so that the length of the metal foil is changed following the strain imposed on the object, and by measuring the changing resistance value of the metal foil, the strain of the object can be measured.

A strain gauge using a Cu—Ni alloy foil or Ni—Cr alloy foil is known as products that have so far been commercially available.

As a technique to secure and stabilize the attachment of the strain gauge, a strain gauge with a protector is disclosed in JP-A-09-053907. JP-A-07-35628, on the other hand, discloses a structure as technique to protect a strain gauge from an external environment by maintaining the moisture resistance and insulation.

In strain measurement, the strain generated in the object of measurement is required to be positively followed by the strain of a measurement unit. In the case where the strain is measured using a semiconductor mechanical quantity measuring apparatus, the rigidity of a thick silicon semiconductor substrate may make it difficult for the strain of the measurement unit to follow the strain of the object of measurement. In the case where the silicon semiconductor substrate is reduced in thickness, on the other hand, the effect of the wiring or the like members on the silicon surface may pose the problem of a disturbed strain of the measurement unit, resulting in a deteriorated measurement accuracy or the silicon being cracked in the process. In a protracted measurement operation or the measurement in a harsh environment, on the other hand, the breakage of the semiconductor, the separation of the object of measurement from the measurement unit and the operation failure due to moisture are problems to be obviated.

SUMMARY OF THE INVENTION

The object of this invention is to provide a semiconductor mechanical quantity measuring apparatus which obviates the aforementioned problems and makes possible the strain measurement with high accuracy over a long period of time.

The problems described above can be solved by a structure in which a first main surface of a strain detecting semiconductor element is coupled to an object of measurement, a second main surface of the element thereof is supported on a wiring board through a first elastic member, and at least a part of the joint between the strain detecting semiconductor element and the first elastic member is reinforce with resin thereby to reduce the elastic modulus of the first elastic member below that of the resin.

The interposition of the first elastic member small in elastic modulus between the semiconductor element and the wiring board reduces the effect of the rigidity or thermal deformation of the wiring board on the strain of the measurement unit arranged on the device surface of the semiconductor element and thus makes possible the high-accuracy strain measurement. Also, a triple-layer structure including a semiconductor element, a first elastic member having a small elasticity modulus and a wiring board in which the semiconductor element and the wiring board having a comparatively high rigidity are arranged on the two sides of the first elastic member having a small elastic modulus increases the geometrical moment of inertia for an increased bending rigidity as compared with a single semiconductor element structure. As a result, the radius of curvature of the bending deformation of the semiconductor element caused by an external force applied during the processing is reduce, and therefore the cracking of the semiconductor element is prevented. This makes it possible to use a semiconductor element having a smaller thickness and improve the ability of the strain of the measurement unit to follow the strain of the object of measurement. Further, by reinforcing the joint between the semiconductor element and the first elastic member with resin, the thin film formed on the device surface of the semiconductor element is prevented from coming off.

Due to these effects, the semiconductor mechanical quantity measuring apparatus according to this invention can be used to measure the strain with a high accuracy over a long period of time.

BRIEF DESCRIPTION OF THE DRAWINGS

FIGS. 7A-7D are diagram for explaining a method of arranging a mechanical quantity measuring apparatus according to the invention on an object of measurement.

DETAILED DESCRIPTION OF THE INVENTION

A first embodiment of the invention is described below with reference to the drawings.

First Embodiment

Figure 1C:
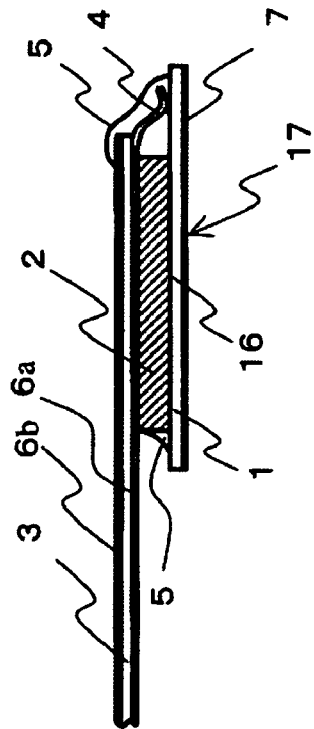
FIGS. 1A-1D are diagram for explaining a first embodiment of the invention.
Figure 1D:
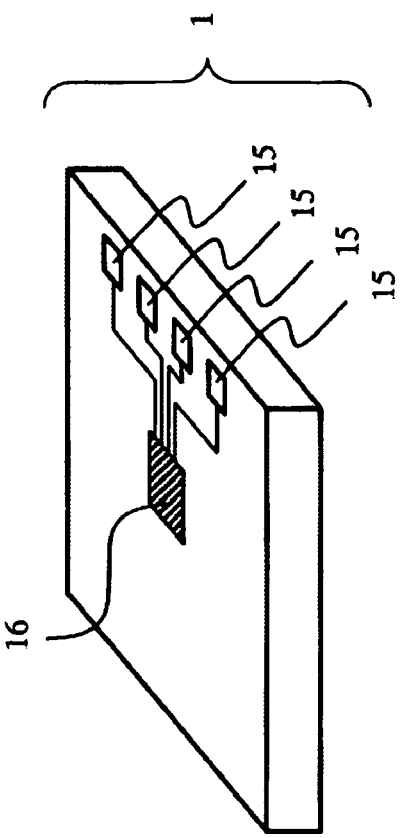
Figure 1A:
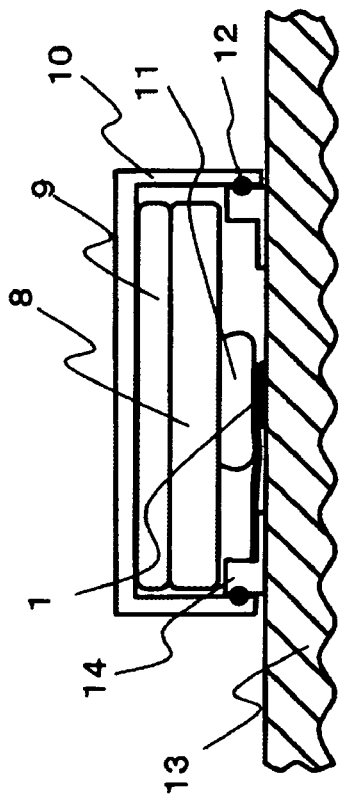

FIGS. 1A to 1D are schematic diagrams showing a mechanical quantity measuring apparatus according to the first embodiment of the invention. FIG. 1A is an overall sectional view of the mechanical quantity measuring apparatus, FIG. 1B an overall top plan view thereof, FIG. 1C an enlarged sectional view of the neighborhood of the strain measurement unit, and FIG. 1D a schematic diagram of a semiconductor element.

As shown in FIG. 1A, according to this embodiment, the mechanical quantity measuring apparatus is used by being arranged on the surface of an object 13 of measurement. A semiconductor element 1 is bonded directly to the object of measurement. The semiconductor element 1 according to this embodiment, as schematically shown in FIG. 1D, includes a strain measurement unit on a part of the surface having the thin films thereof, i.e. on a part of the device surface thereof. The strain measurement unit is a semiconductor device for producing an output in accordance with the amount of strain generated, which can be detected by retrieving the output from pads 15. In order to measure the strain generated in the object 13 using the semiconductor element 1, therefore, the strain of the strain measurement unit is required to appropriately follow the strain of the object 13. According to this embodiment, the semiconductor element 1 is bonded directly to the object of measurement and thus the strain-following ability is improved more than in the case where the the semiconductor element 1 is bonded through another member.

In addition to the semiconductor element 1, a base 14 connected with wiring layers 6a, 6b for supporting the semiconductor element 1 is bonded to the object of measurement. The base 14 is arranged on the surface of the object 13 in such a position as to surround the semiconductor element 1. The base 14, which is bonded directly to the object of measurement, is desirably a member having a small rigidity not to restrict the deformation of the object of measurement. Also, in order to secure the bonding strength with the object against the temperature change of the measurement environment, on the other hand, the coefficient of linear expansion of the base 14 is desirably as near to that of the object of measurement as possible. In view of these facts, the base 14 according to this embodiment is formed of a bent stainless plate 0.3 mm thick in consideration of the probable fact that the stainless may be the main component of the object 13 according to this embodiment. In the case where a material other than the stainless is expected to be used for the object 13, on the other hand, the base 14 is effectively formed of a material having a coefficient of linear expansion as near to that of the object 13 as possible. In the case where the object 13 is a magnetic material, the base 14 is partly or wholly formed of a magnet to fix the base 14 to the object 13 without adhesive.

The base 14 is connected to a case 10 through a hermetic member 12. The semiconductor element 1, a control board 9 and a battery 8 arranged in the case 10 are thus protected from the external environment by the base 14, the hermetic member 12 and the case 10. Therefore, the case 10 is desirably formed of a material impermeable to water and oil. Also, in the case where the radio communication is conducted with an external device using the control board 9 arranged in the case 10, the case 10 is required to be formed of a material not cutting off the radio wave. Further, in the case where the object of measurement is movable or rotatable, the light weight of the case 10 is another factor desired. In view of these facts, the case 10 according to this embodiment is formed of ABS (acrylonitrile butadiene styrene) resin about 1.0 mm thick. In a high-temperature measurement environment, the PPS (polyphenylene sulfide) resin high in heat resistance is effectively used. According to this embodiment, an O-ring of rubber is used for the hermetic member 12. For this purpose, the portion of the base 14 and the case 10 where the hermetic member 12 is arranged is formed with a groove having a semicircular cross section. Instead of arranging the O-ring constituting the hermetic member 12 between the base 14 and the case 10 to secure hermeticity as in this embodiment, the hermetic member 12 may alternatively be formed of a seal member. In such a case, although the base 14 and the case 10 is not required to be formed of a groove, the process of filling a seal material is required after arrangement of the base 14 and the case 10. Instead of forming the hermetic member 12 independently of the base 14 and the case 10 as in this embodiment, on the other hand, the hermeticity can be secured by forming a protrusion on the case 10 and a depression on the base 14 and utilizing the elasticity of the case 10 and the base 14.

As viewed from the object 13 side, the semiconductor element 1, a compressive elastic member 11, the battery 8 and the control board 9 are arranged in that order in the case 10. The control board 9 controls the operation of transmitting and receiving signals to and from the semiconductor element 1, supplying power to the semiconductor element 1 and transmitting and receiving signals to and from devices external to the semiconductor mechanical quantity measurement apparatus. According to this embodiment, the control board 9 is configured of two stages of single-sided glass epoxy substrates. According to this embodiment, an antenna is arranged on the control board 9 to use the radio wave for the transmitting and receiving signals to and from the devices external to the semiconductor mechanical quantity measuring apparatus. By arranging the control board 9 far from the object 13 above the battery 8 as in this embodiment, the effect of the object 13 and the battery 8 on the transmission/receiving of the radio wave can be reduced and the long-distance communication is made possible. The compressive elastic member 11 arranged under the battery 8 is held between the battery 8 on the upper surface and a flexible board 3 on the lower surface thereof and adapted for vertical compression. Due to the provision of the compressive elastic member 11 between the case 10 and the semiconductor element 1 in this way, the bonding surface between the semiconductor element 1 and the object 13 is subjected to a compression load. As a result, the semiconductor element 1 and the object 13 are not separated from each other and stable strain measurement is made possible over a long period of time.

Figure 1B:
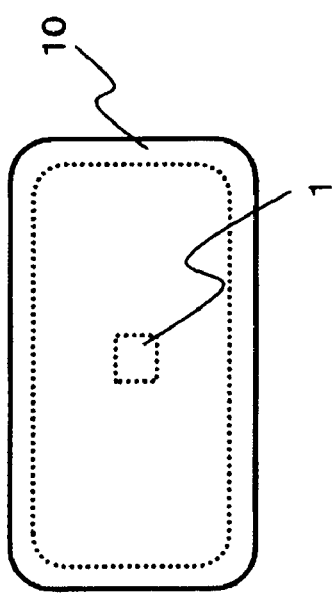

The semiconductor element 1, as shown in the top plan view of FIG. 1B, is arranged in the neighborhood of the central portion of the case 10. In FIG. 1B, the component members other than the case 10 and the semiconductor element 1 are not shown. The arrangement of the semiconductor 1 in the neighborhood of the central portion of the case 10 in this manner makes possible the strain measurement with the minimum effect of the strain disturbance which may be caused in the object of measurement by the rigidity of the case 10 and the base 14.

FIG. 1C is an enlarged sectional view showing the neighborhood of the strain measurement unit. The semiconductor element 1 has one surface thereof constituting the bonding surface to be bonded with the object 13. According to this embodiment, the device surface with the strain measurement unit thereon is arranged on the side far from the object 13 while the reverse surface of the semiconductor element 1 is bonded with the object 13. By arranging the semiconductor element 1 in this way, the electrical signals can be easily retrieved from the pads 15 on the device surface. The silicon of the semiconductor element 1 has a low bonding strength, and in the case where silicon is bonded directly to the object of measurement, the semiconductor element 1 may be separated while in use. According to this embodiment, therefore, a metal thin film high in bonding strength is formed as a reverse surface layer 7 on the reverse surface of the semiconductor element 1. Instead of forming the metal thin film as the reverse surface layer 7 of the semiconductor element 1 as in this embodiment, a silicon oxide layer or a resin layer suitable for bonding may alternatively be formed on the reverse surface of the semiconductor element 1 to increase the bonding strength. A different fabrication method is employed according to whether an oxide layer or a metal film is formed, and therefore an appropriate method can be selected in accordance with the device involved and the production cost. Also, the oxide layer strongly attaches to the silicon substrate, and therefore can prevent the semiconductor element reverse surface layer 7 from being separated from the silicon substrate. In the case where a resin layer is formed as the semiconductor element reverse surface layer 7, the semiconductor element reverse surface layer 7 itself can be used as a bonding layer.

A flexible board 3 having wiring layers 6a, 6b on both sides thereof is arranged above the device surface of the semiconductor element 1 through a low-elasticity member 2 low in elastic modulus. According to this embodiment, a polyimide tape about 50 µm thick is used for the flexible substrate 3 and Cu about 30 µm thick for the wiring layers 6a, 6b. The use of the polyimide tape for the flexible board 3 makes possible the heat treatment at the bonding step or the resin sealing step in the fabrication process. The lead wire 4 led out from the first wiring layer 6a is connected to the pads 15 on the device surface of the semiconductor element 1 to secure electrical conduction. In this way, the flexible board 3 and the wires 6a, 6b are arranged at positions far from the semiconductor element 1, so that the rigidity of the members including the flexible substrate 3 and the wires 6a, 6b affects the strain of the strain measurement unit 16 of the semiconductor element 1 to a lesser degree. Also, in view of the fact that the flexible board 3 and the semiconductor element 1 comparatively large in rigidity are arranged on the upper and lower surfaces, respectively, of the low-elasticity member 2, the bending rigidity of this stack structure is increased. With this structure, the bending rigidity can be secured even in the case where the thickness of the semiconductor element 1 is decreased, and therefore the semiconductor element 1 is prevented from cracking during the operation such as bonding. Also, since a member small in elastic modulus is arranged at the central portion of the stack structure, the rigidity along the shearing direction is small and therefore the strain generated in the sensor unit of the semiconductor element 1 is prevented from being affected by the low-elasticity member 2, the flexible board 3 or the wire layers 6a, 6b. By using this structure, therefore, the strain measurement with high accuracy is made possible. Further, even in the case where the thermal deformation amount is varied between the semiconductor element 1 and the flexible board 3 or the wires 6 due to the temperature change in the measurement environment, the difference in thermal deformation amount is absorbed by the deformation of the low-elasticity member 2, and therefore, has no large effect on the strain measurement.

The joint between the semiconductor element 1 and the lead 4 and the lead 4 itself are sealed with the resin 5. Also, the resin 5 flows around the low-elasticity member 2 and reinforces the joint between the low-elasticity member 2 and the semiconductor element 1. According to this embodiment, epoxy potting resin is used as the resin 5. The potting resin before hardening has a fluidity and therefore can flow around the low-elasticity member 2. As a result, the process of sealing the lead and the process of reinforcing the joint between the low-elasticity member 2 and the semiconductor element 1 can be accomplished in one step. The coefficient of linear expansion of the silicon making up the semiconductor element 2 is about 3 ppm/K, while that of the elastomer used for the low-elasticity member 2 according to this embodiment is not less than 30 ppm/K. Due to this large difference in the coefficient of linear expansion, a large local stress is generated by the thermal load at the ends of the joint between the low-elasticity member 2 and the semiconductor element 1 not reinforced with the resin 5, and the thin film on the device surface of the semiconductor element 1 may be separated. According to this embodiment, however, the end portions of the joint between the semiconductor element 1 and the low-elasticity member 2 are reinforced with the resin 5, and therefore a highly reliable apparatus is provided with the thin film prevented from coming off. The provision of the resin 5 around the low-elasticity member 2 increases the shearing rigidity of the particular portion. In view of the fact that the low-elasticity member 2 is sufficiently lower in elastic modulus than the resin 5 and the strain measurement unit 16 is arranged in the neighborhood of the central portion of the semiconductor element 1 far from the resin 5, however, the rigidity of the resin 5 has only a very small effect on the strain measurement.

The semiconductor mechanical quantity measuring apparatus having the configuration described above makes possible high-accuracy strain measurement over a long period of time.

Figure 2:
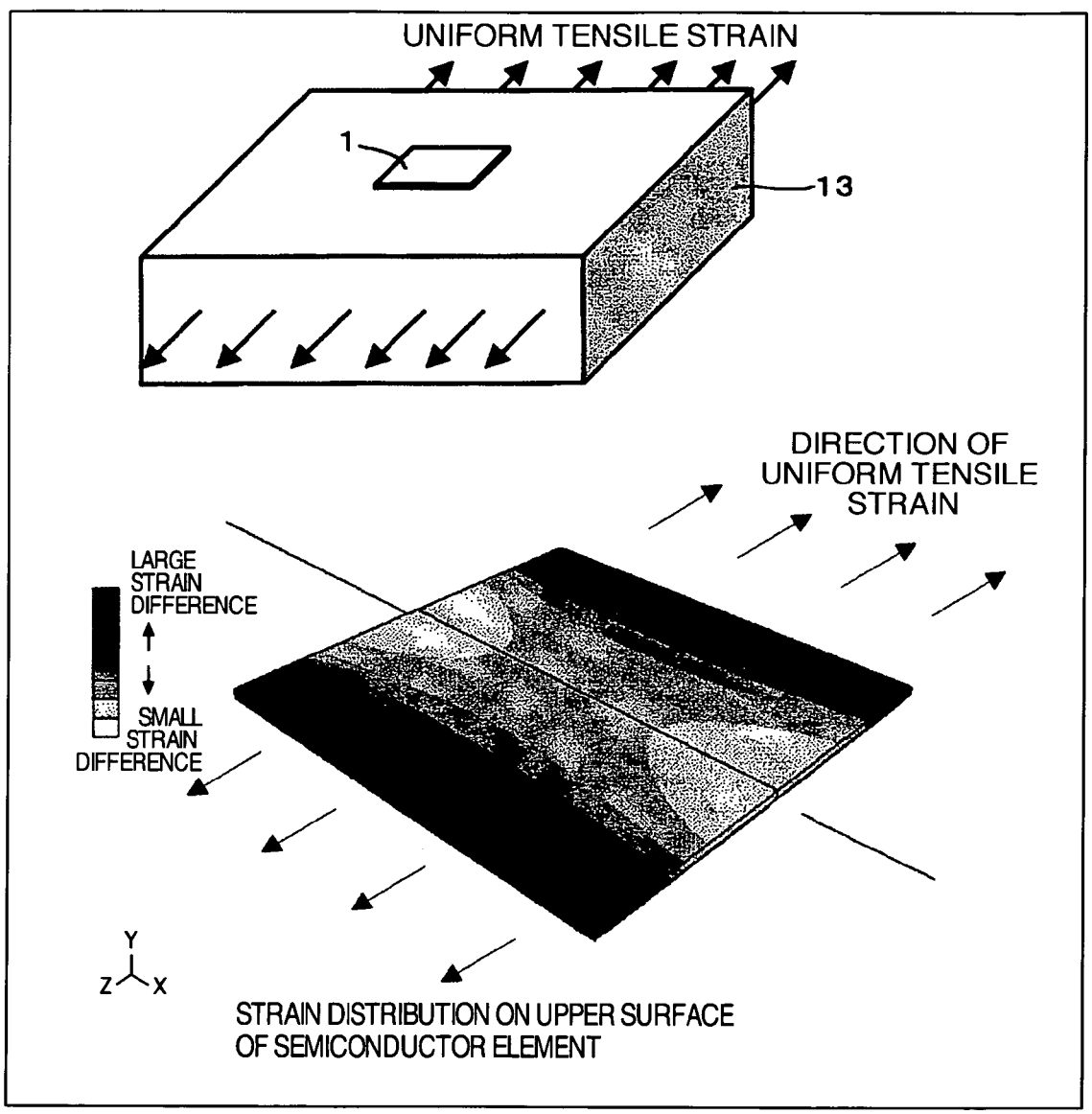
FIG. 2 is a first diagram for explaining the effects of the invention.

FIGS. 2 to 6 are diagrams showing the effects of the invention. FIG. 2 is a diagram showing the distribution of the strain generated on the upper surface of the semiconductor element 1 by the uniform tensile strain generated in the object 13 to which the semiconductor element 1 alone is bonded. The semiconductor element 1 alone cannot function as a mechanical quantity measuring apparatus. The strain distribution under this condition is shown, however, in order to determine the strain generated in the semiconductor element 1 bonded as a single unit to the object 13. The object 13 is a stainless plate 10.0 mm thick, the semiconductor element 1 is formed as a square having each side 0.25 mm long and the thickness of 0.05 mm. The strain distribution diagram shows the difference between the strain of the object 13 of measurement and the strain generated in the semiconductor element 1. In FIG. 2, the portion thicker in color has a larger strain difference. This indicates that the strain of the object 13 fails to be followed. The strain generated on the upper surface of the semiconductor element 1 fails to follow the strain of the object of measurement at the ends thereof in the direction parallel to the strain of the object. The portion nearer to the central portion of the semiconductor element 1 has a higher following ability. This is by reason of the fact that only the lower surface of the semiconductor element 1 is bonded to the object 13 while the semiconductor element 1 has a considerable thickness, and therefore the end portions of the upper surface of the semiconductor element 1 are rather free of the retsriction from the object 13.

Figure 3:
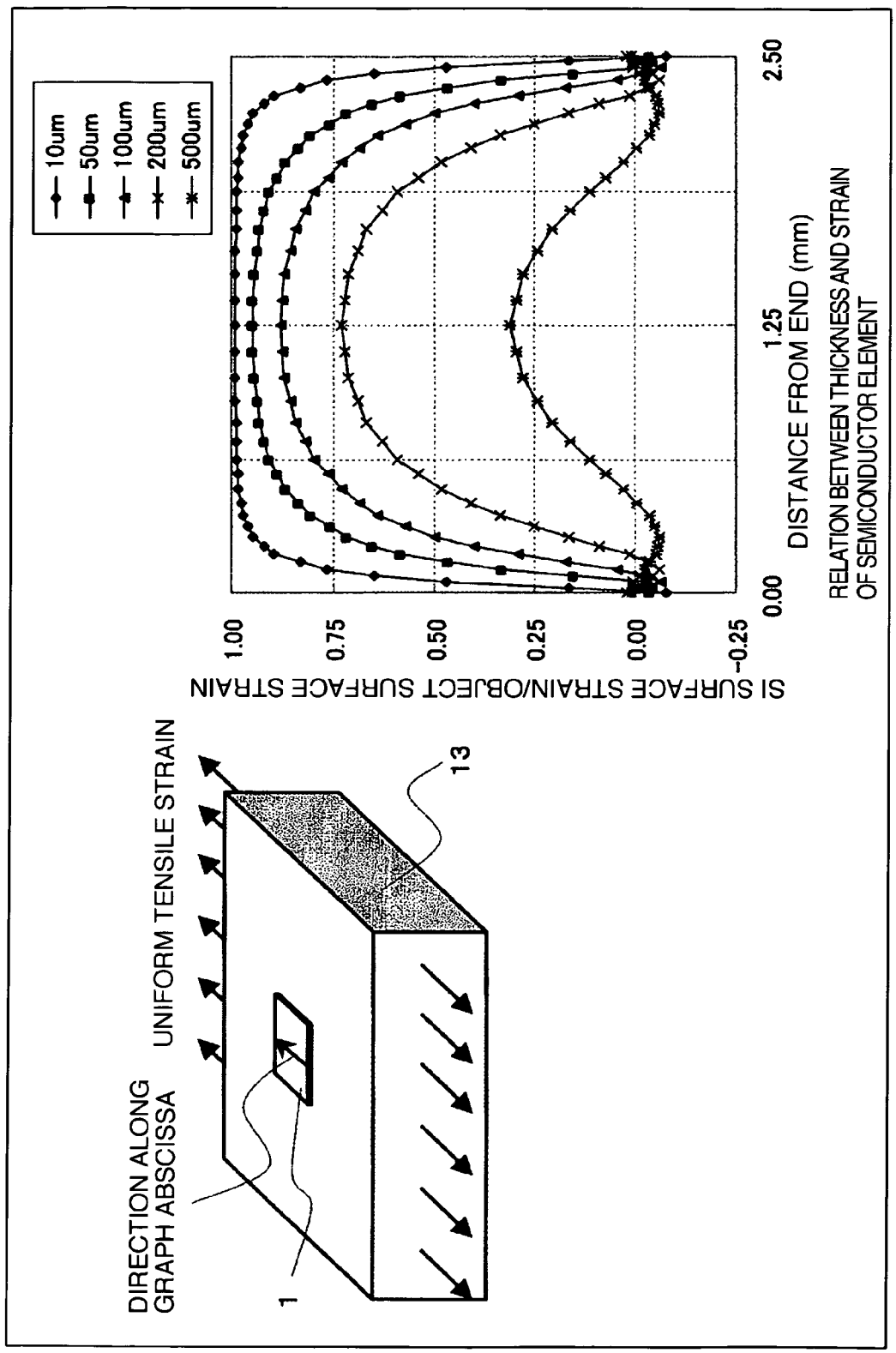
FIG. 3 is a second diagram for explaining the effects of the invention.

FIG. 3 is a diagram showing the distribution of the strain generated on the upper surface of the semiconductor element 1 with the thickness thereof changed under the conditions shown in FIG. 2. The abscissa of the graph represents the distance from the ends of the upper surface of the semiconductor element 1 along the cross section of the semiconductor element 1 cut into halves in the direction parallel to the strain generated on the upper surface of he semiconductor element 1. The ends of the semiconductor element 1 are located at 0.00 mm and 2.50 mm, respectively, and the central portion thereof at 1.25 mm along the abscissa. The ordinate of the graph represents the ratio between the strain generated on the upper surface of the semiconductor element 1 and the strain generated in the object 13 of measurement. This value nearer to 1.0 indicates that the strain of the semiconductor element 1 can follow the strain of the object 13 more faithfully. This graph, showing the strain distribution for the thickness of 10, 50, 100, 200 and 500 µm of the semiconductor element 1, indicates that the thinner the semiconductor element 1, the more faithfully the strain of the semiconductor element 1 can follow the strain of the object 13 of measurement. The graph also indicates that for all the thickness, the strain of the portion nearer the central portion of the semiconductor element 1 can more faithfully follow the strain of the object 13, while the strain of the object 13 of measurement cannot be faithfully followed by the strain of the ends of a thin semiconductor element 1, if small in thickness. From this, the semiconductor element 1 is desirably thin, and the strain measurement unit on the device surface is desirably located as near to the central portion of the semiconductor element 1 as possible.

Figure 4:
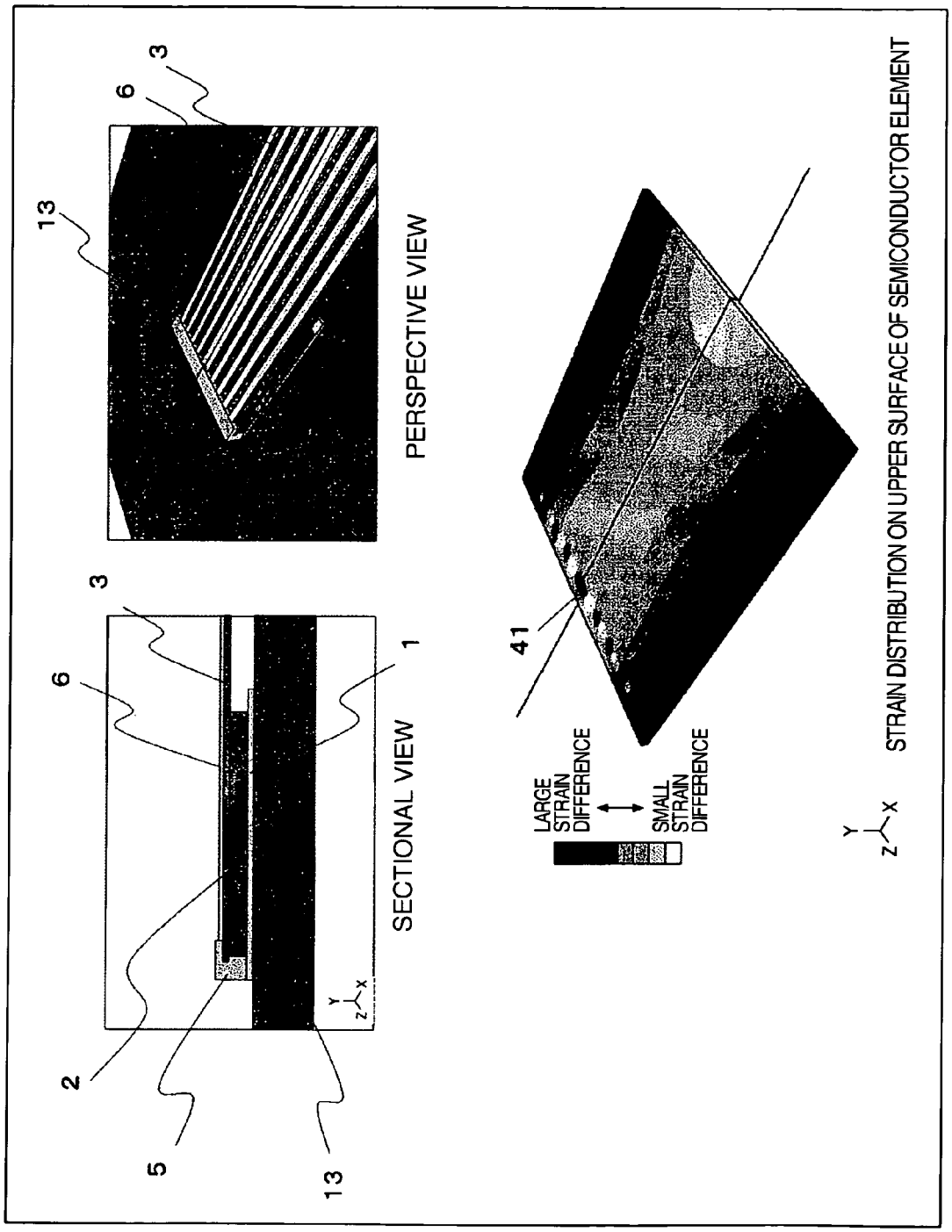
FIG. 4 is a third diagram for explaining the effects of the invention.

FIG. 4 is a diagram showing the distribution of the strain generated in the semiconductor element 1 in the case where the flexible board 3 and the wires 6 are arranged and bonded to the object 13 on the semiconductor element 1 through the low-elasticity member 2 and a uniform tensile strain is generated in the object 13 as in the case of FIG. 2. The semiconductor element 1 is 50 μm thick, the low-elasticity member is formed of elastomer 150 μm thick, the flexible substrate 3 is a polyimide tape 50 μm thick, and the wires 6 are formed of Cu 30 μm thick. The wires 6 are arranged only in one layer on the upper surface of the flexible board 3 and led out in the direction perpendicular to the strain of the object 13. The strain distribution of the semiconductor element 1, except for the neighborhood of the joint 41 between the semiconductor element 1 and the wires 6, coincides well with the strain distribution in the case where the semiconductor element 1 alone is bonded as shown in FIG. 2. This indicates that the semiconductor mechanical quantity measuring apparatus according to this invention can measure the strain without being affected by the flexible board 3 and the wires 6. The strain of the semiconductor element 1 is disturbed in the neighborhood of the joint 4 between the semiconductor element 1 and the wires 6 under the effect of the wires 6, the flexible board 3 and the resin 4. The strain measurement unit, therefore, is desirably arranged on the device surface of the semiconductor element 1 as far as possible from the joint 41 between the semiconductor element 1 and the wires 6.

Figure 5:
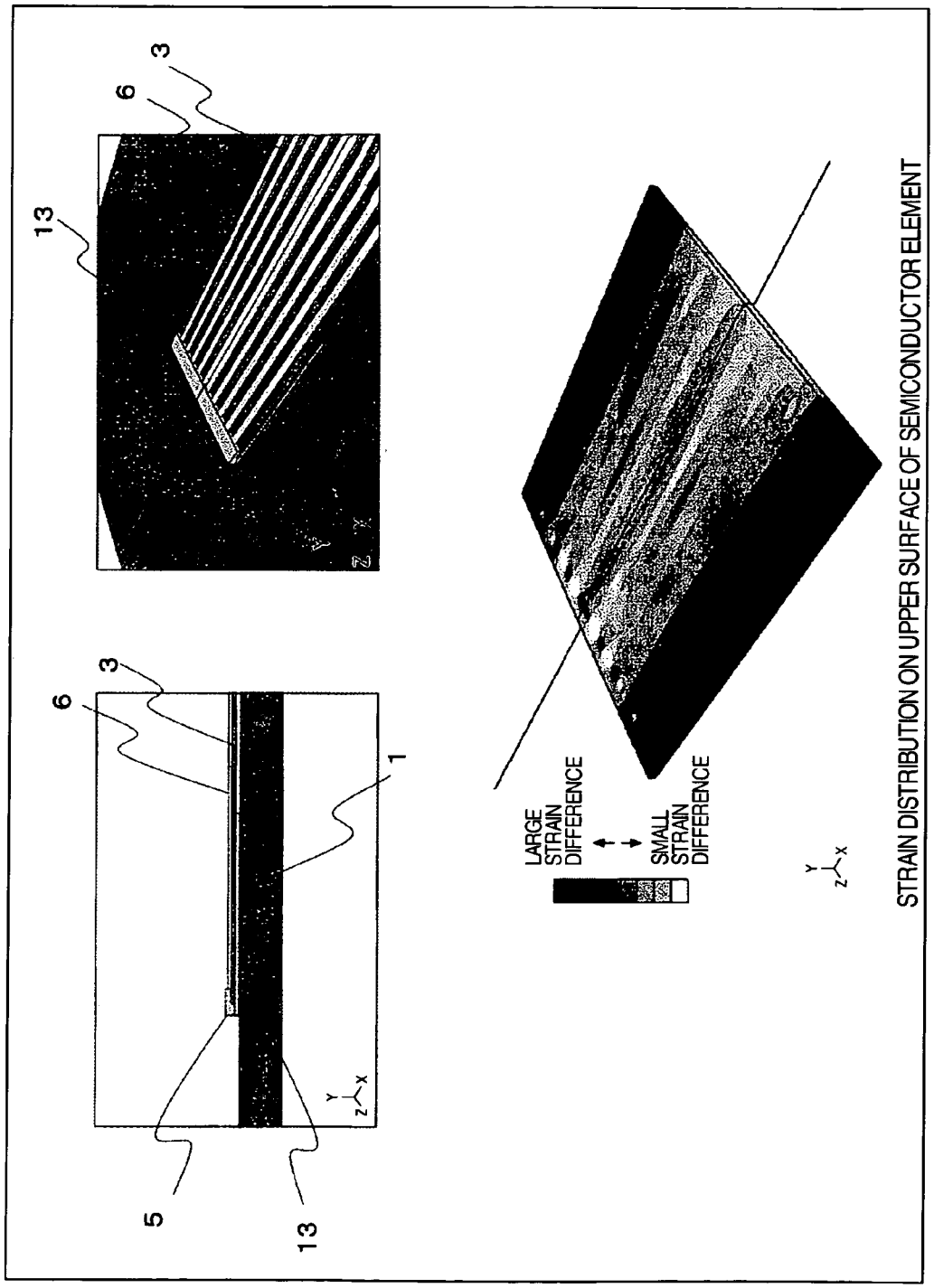
FIG. 5 is a fourth diagram for explaining the effects of the invention.

FIG. 5 is a diagram showing the distribution of the uniform tensile strain generated in the semiconductor element 1, as in FIGS. 2 and 4, in the case where unlike in the invention, the flexible board 3 and the wires 6 are arranged on the semiconductor element 1 and directly bonded to the object 13 without the low-elasticity member therebetween. In this structure, the same thickness of the members as in FIG. 4 are employed for other than the low-elasticity member. Unlike in the strain distribution shown in FIG. 2, the strain of the semiconductor element 1 is disturbed along the shape of the wires 6 even in the neighborhood of the central portion of the semiconductor element 1. With other than the structure according to the invention, therefore, the high-accuracy strain measurement is difficult due to the effect of the wires 6, the flexible board 3 and the resin 4.

Figure 6A:
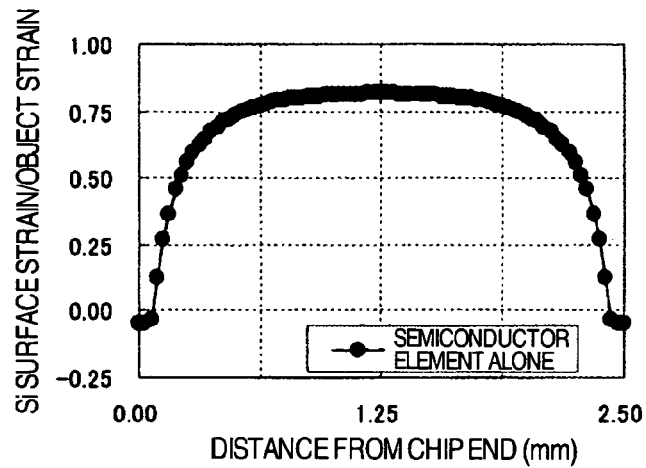
FIGS. 6A-6C are fifth diagram for explaining the effects of the invention.
Figure 6B:
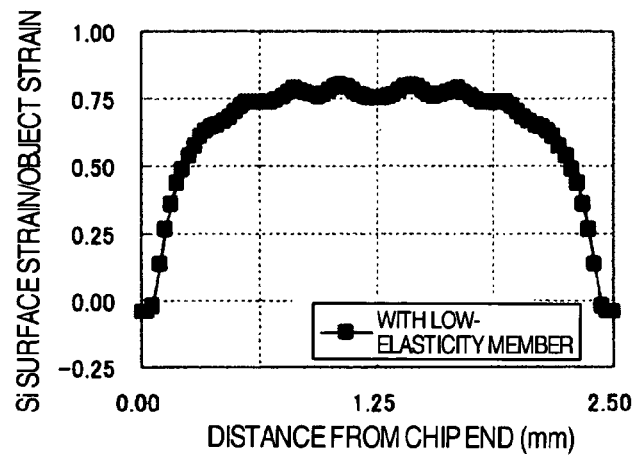
Figure 6C:
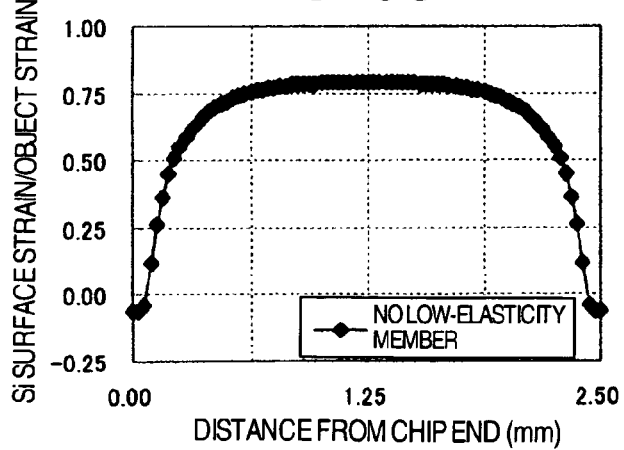

FIG. 6 is a diagram showing the strain distributions in one cross section shown in FIGS. 2, 4, 5, respectively. The ordinate and the abscissa of the graphs represent the same items as in FIG. 3. The strain distribution with the semiconductor element 1 alone bonded as shown in FIG. 6A is equivalent to the strain distribution obtained by the semiconductor mechanical quantity measuring apparatus according to the invention shown in FIG. 6B. The strain distribution obtained by other than the semiconductor mechanical quantity measuring apparatus according to the invention, on the other hand, develops the strain disturbance, and the accurate measurement is difficult even at the central portion of the semiconductor element 1. These drawings clearly show the advantage of this invention.

FIG. 7 is a diagram for explaining the process of bonding the semiconductor mechanical quantity measuring apparatus according to the first embodiment of the invention to an object of measurement. First, as shown in FIG. 7A, the case 10 and the base 14 are separated from each other, and a load can be imposed directly on the semiconductor element 1 toward toward the object of measurement independently of the base 14 at a position of the flexible substrate 3 where the semiconductor element 1 is mounted. According to this invention, the semiconductor element 1 can be bonded to the object 13 in such a manner that the surface of the flexible board 3 on which the semiconductor element 1 is mounted is pressed at the position 71 without the intermediary of the case 10 at the time of bonding. Thus, the semiconductor element 1 and the object 13 can be bonded more securely to each other. Further, the use of the flexible board 3 has a flexibility as a wiring board facilitates the positioning of the semiconductor element 1. Next, as shown in FIG. 7B, the reverse surface of the semiconductor element 1 and the base 14 are bonded to the object 13. While the adhesive is being hardened during the bonding process, a compression load is desirably imposed on the bonding surface. According to this embodiment, the base 14 and the flexible board 3 have different heights and therefore a bonding jig tool 22 is used. Also, the semiconductor element 1 and the base 14, though bonded to the object 13 at the same time in this embodiment, may be bonded independently of each other depending on the bonding environment. In such a case, the time required for bonding is lengthened, but the bonding jig tool 22 can be eliminated in bonding operation. Next, as shown in FIG. 7C, the compressive elastic member 11, the battery 8 and the control board 9 are arranged on the semiconductor element 1. According to this embodiment, the electrical conduction is secured in this stage using a connector between the flexible board 3 and the control board 9 and between the control board 9 and the battery 8. Nevertheless, the connection can alternatively be secured between these component elements in the initial stage without using the connector by the bonding method such as solder or ultrasonic means. At the steps shown in FIGS. 7A, 7B, however, care must be taken not to cut the connecting portion. Finally, the case 10 is arranged to complete the whole arrangement. As the result of mounting the case 10, the compressive elastic member 11 assumes a vertically crushed shape, and a compression load is imposed on the bonding surface between the semiconductor element 1 and the object 13.

Second Embodiment

Figure 8:
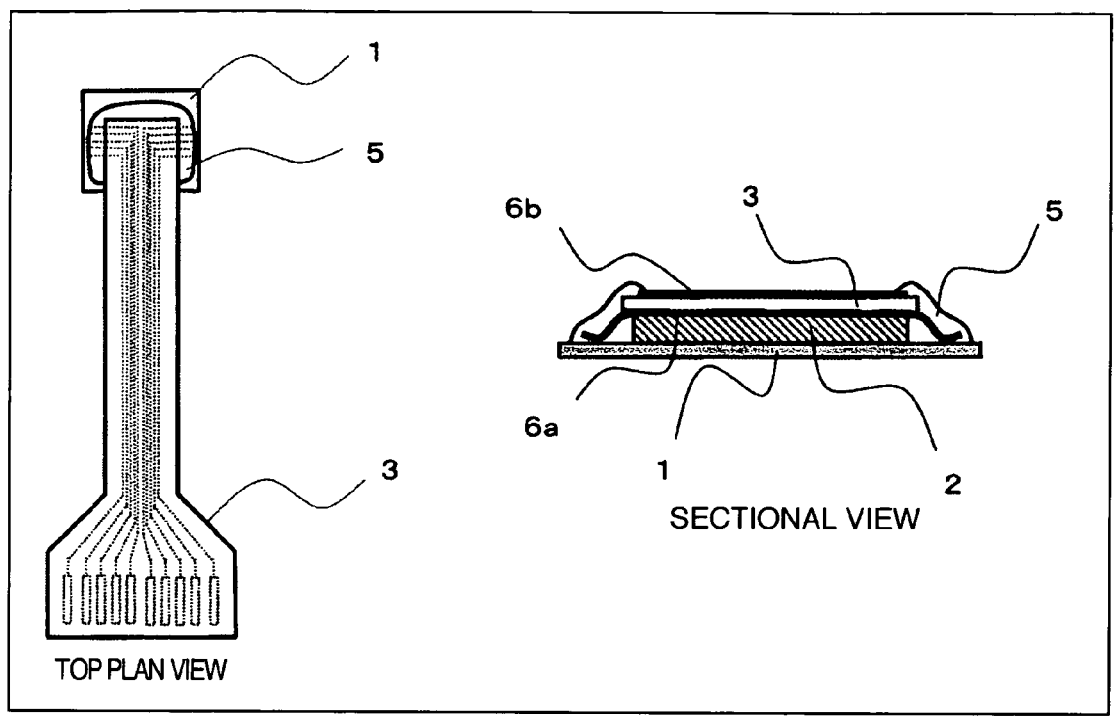
FIG. 8 is a diagram for explaining a second embodiment of the invention.

FIG. 8 is a diagram showing the flexible board 3 and the semiconductor element 1 mounted on the flexible board 3 of the mechanical quantity measuring apparatus according to a second embodiment of the invention. The main difference of this embodiment from the first embodiment lies in that the semiconductor element 1 and the wires 6, which are connected to each other on one side of the semiconductor element 1 in the first embodiment, are connected to each other on two sides of the semiconductor element 1 in this embodiment. By providing connecting points on a plurality of sides as in this embodiment, more information can be input or output to or from the semiconductor element 1. At the same time, according to this embodiment, the leads on a plurality of sides are sealed with resin, and therefore the resin 5 is coated in a greater amount than in the first embodiment, resulting in an increased overall rigidity. Even in such a case, however, the strain measuring unit on the device surface of the semiconductor element 1 is arranged in the neighborhood of the central portion of the semiconductor element 1 far from the resin. Thus, the rigidity of the resin 5 is prevented from having an effect on the strain of the strain measurement unit, and therefore a high-accuracy measurement is made possible.

Unlike in this embodiment, the connecting points can be provided on three or four sides instead of on two sides of the semiconductor element 1.

Third Embodiment

Figure 9:
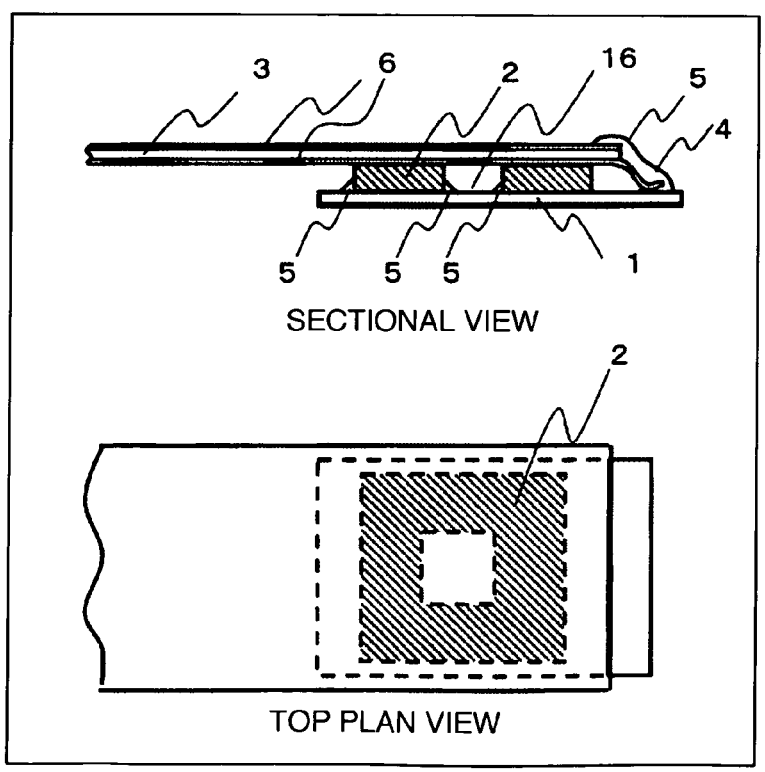
FIG. 9 is a diagram for explaining a third embodiment of the invention.

FIG. 9 is a diagram showing the flexible board 3 and the semiconductor element 1 mounted on the flexible board 3 of the mechanical quantity measuring apparatus according to a third embodiment of the invention. The main difference of this embodiment from the first embodiment lies in that in the third embodiment, the low-elasticity member 2 is formed with a hole in the neighborhood of the central portion of the semiconductor element 1 where the strain measurement unit is arranged. As the result of forming this hole in the low-elasticity member 2, nothing is arranged on the upper surface of the strain measurement unit 16. Thus, the effect that the rigidity of the low-elasticity member 16 as well as those of the flexible board 3 and the wires 6 has on the sensor is eliminated. As a result, a structure suitable for the operating situation requiring a higher accuracy of measurement is obtained.

Fourth Embodiment

Figure 10C:
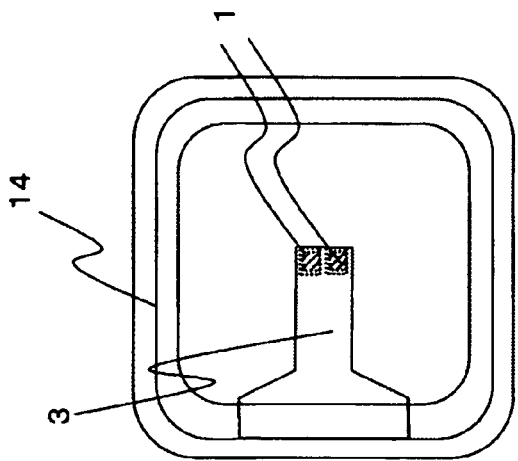
FIGS. 10A-10C are diagram for explaining a fourth embodiment of the invention.
Figure 10A:
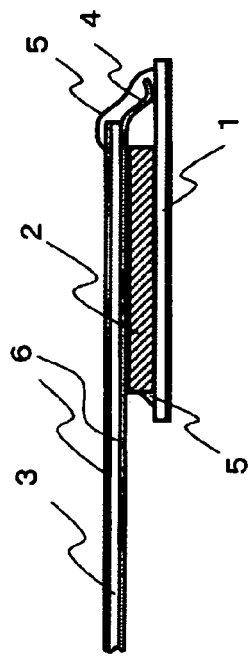
Figure 10B:
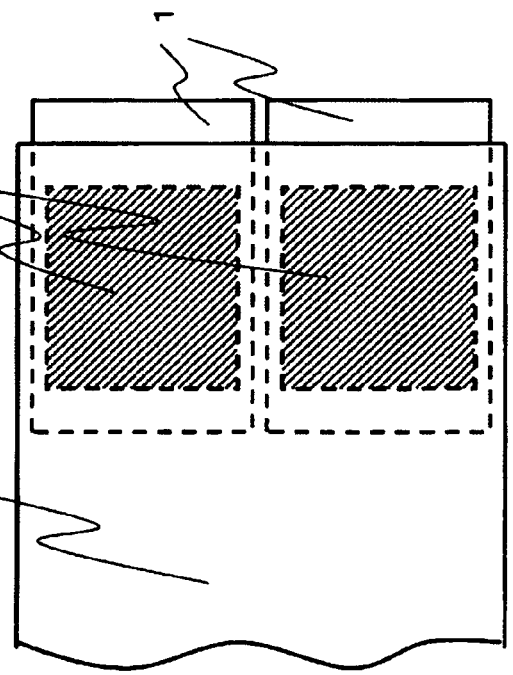

FIGS. 10A to 10C are diagrams showing the flexible board 3 and the semiconductor element 1 mounted on the flexible board 3 of the mechanical quantity measuring apparatus according to a fourth embodiment of the invention. The main difference of this embodiment from the first embodiment lies in that in the fourth embodiment, a plurality of the semiconductor elements 1 are arranged on a single flexible board 3. These semiconductor elements 1, as shown in FIG. 10C, are arranged at positions symmetric with each other on the base 14. The provision of the plurality of the semiconductor elements 1 permits the measurement of a greater mechanical quantity. Also, since the semiconductor elements 1 are arranged symmetrically with each other on the base 14, the plurality of the semiconductor elements 1 can have similar measurement conditions. Unlike in this embodiment, three or more instead of two semiconductor elements 1 may of course be arranged.

Fifth Embodiment

Figure 11:
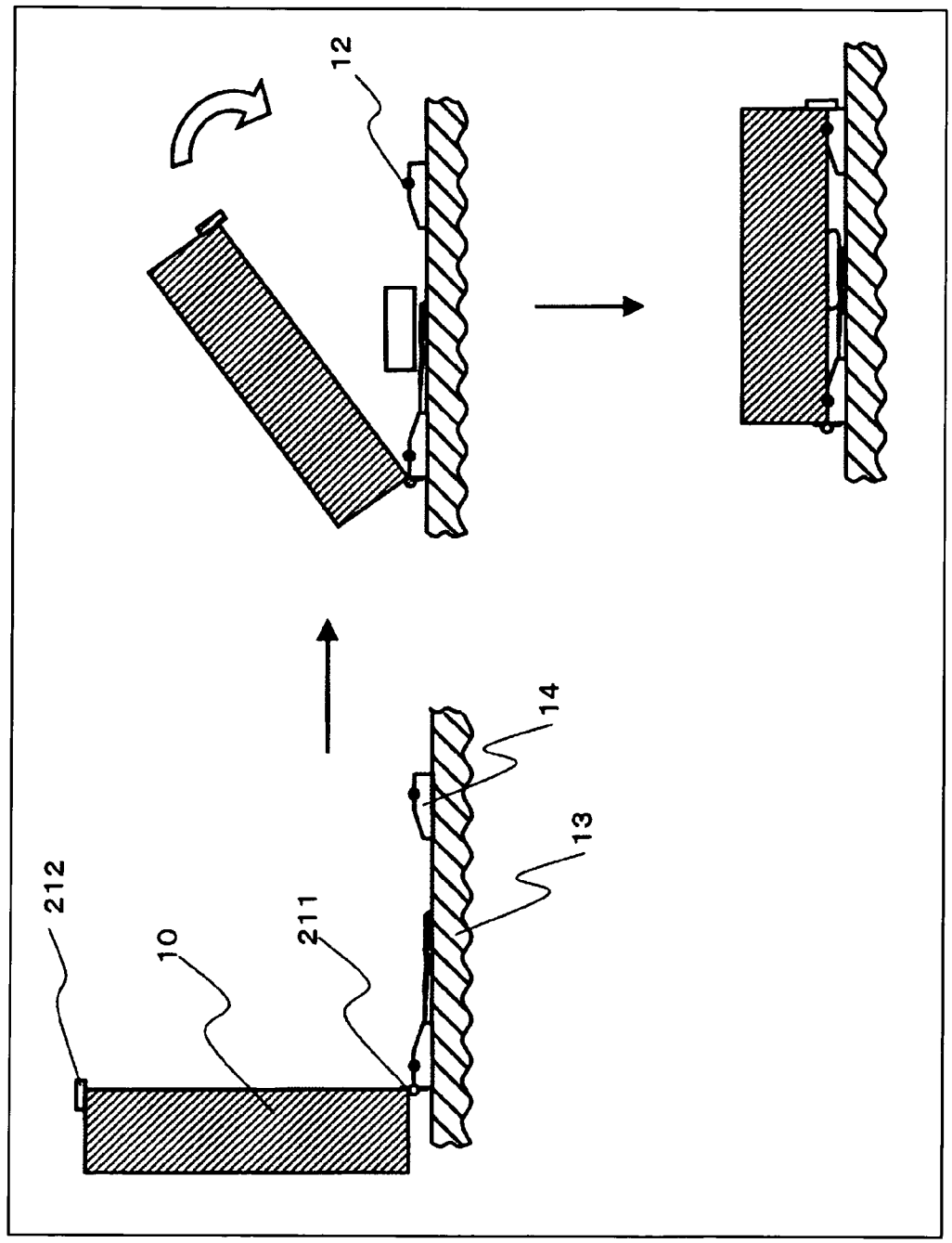
FIG. 11 is a diagram for explaining a fifth embodiment of the invention.

FIG. 11 is a diagram showing a mechanical quantity measuring apparatus according to a fifth embodiment of the invention. The main difference of this embodiment from the first embodiment lies in that unlike in the first embodiment with the case 10 and the base 14 separated as two members from each other, the case 10 and the base 14 are connected to each other through a hinge member 211. In operation, the case 10 and the base 14 are set at an angle to each other, and the semiconductor element 1 in the base 14 is bonded, after which the base 14 is covered with the case 10 using the hinge member 211. The case 10 is kept closed by a hook 212. By integrating the case 10 and the base 14 with each other as in this embodiment, the loss of the case 10 which otherwise might occur when the case 10 is attached or the chance of disconnection of the connecting portion between the flexible board 3 and the control board 9 is eliminated.

Sixth Embodiment

Figure 12:
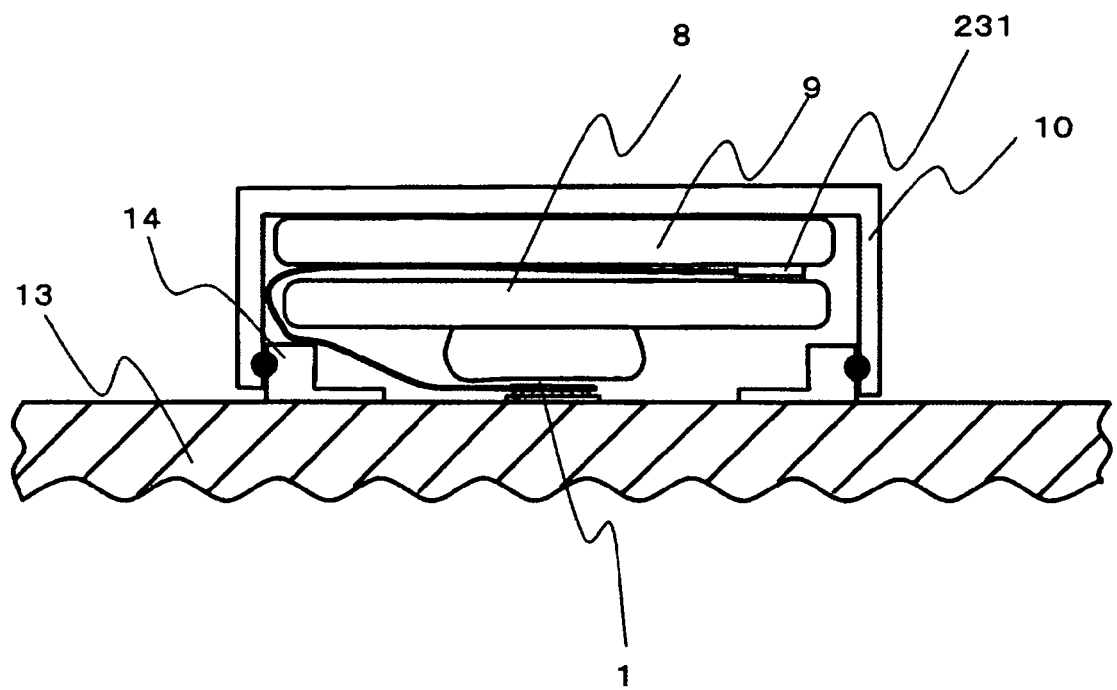
FIG. 12 is a diagram for explaining a sixth embodiment of the invention.

FIG. 12 is a diagram showing a mechanical quantity measuring apparatus according to a sixth embodiment of the invention. The difference of this embodiment from the first embodiment lies in that in the sixth embodiment, the flexible board 3 is connected directly to the control board 9, and the connecting portion 231 thereof is arranged on the reverse surface of the control board 9. This embodiment employs a glass epoxy board for the control board 9 with the semiconductor parts mounted on one surface thereof. In the case where the connector between the flexible board 3 and the control board 9 is arranged on the same surface as the semiconductor parts, the semiconductor parts can be arranged neither in the connector area nor at the portion where the flexible board 3 and the control board 9 are superposed one on the other, resulting in an increased area of the control board 9. By connecting the control board 9 and the flexible board 3 to each other as in this embodiment, however, the control board 9 can be reduced in size, and therefore the size of the semiconductor mechanical quantity measuring apparatus can be effectively reduced.

Also, the arrangement of the connector at the end of the control board 9 can minimize the area of superposition between the flexible board 3 and the control board 9. In this case, the flexible board 3 is considerably bent in the neighborhood of the joint with the connector and therefore the reliability of the connecting portion may be deteriorated. By connecting the flexible board 3 and the control board 9 to each other as in this embodiment, however, the flexible board 3 is not required to be bent in the neighborhood of the connecting portion, and therefore the reliability of connection between the flexible board 3 and the control board 9 can be secured.

Embodiments of the invention are specifically described above. The invention, however, is not limited to those embodiments and can of course be modified variously without departing from the spirit and scope thereof.

This invention can find application with devices for measuring the mechanical quantity such as the strain of an object of measurement.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A semiconductor mechanical quantity measuring apparatus for detecting the strain of an object of measurement by coupling a first main surface of a strain-detecting semiconductor element to the object, wherein the strain-detecting semiconductor element is supported on a wiring board through a first elastic member on a second main surface of the strain-detecting semiconductor element to thereby form a triple layered structure including the semiconductor element, the first elastic member and the wiring board stacked on one another with the first elastic member sandwiched between the semiconductor element and the wiring board, and wherein at least a part of the end portions of the joint between the strain-detecting semiconductor element and the first elastic member is reinforced by resin, and the first elastic member is lower in elastic modulus than the resin, and wherein a bending rigidity of the triple layered structure is greater than a bending rigidity of the semiconductor element to thereby decrease the likelihood of breakage of the semiconductor element due to bending.

2. A semiconductor mechanical quantity measuring apparatus according to claim 1, further comprising a case coupled to the object of measurement, and a second elastic member interposed between the case and the second main surface of the strain-detecting semiconductor element.

3. A semiconductor mechanical quantity measuring apparatus according to claim 2,
wherein as long as the case and the strain-detecting semiconductor element are coupled to the object of measurement, a pressure load is imposed on the strain-detecting semiconductor element toward the object of measurement by the second elastic member.

4. A semiconductor mechanical quantity measuring apparatus according to claim 3, further comprising a control board having a radio communication circuit arranged on the case, wires arranged on the wiring board for connecting the control board and the strain-detecting semiconductor element to each other, and a lead for connecting the wires and the strain-detecting semiconductor element to each other.

5. A semiconductor mechanical quantity measuring apparatus according to claim 2,
wherein the case coupled to the object of measurement hermetically closes the strain-detecting semiconductor element.

6. A semiconductor mechanical quantity measuring apparatus according to claim 1,
wherein the portion of the strain-detecting semiconductor element formed with a strain-detecting element is not coupled with the first elastic member.

7. A semiconductor mechanical quantity measuring apparatus according to claim 2,
wherein the case includes a base coupled to the object of measurement, a cover for holding the second elastic member and a hinge for connecting the base and the cover to each other.

8. A semiconductor mechanical quantity measuring apparatus according to claim 1,
wherein selected one of a metal thin film, a silicon oxide film and a resin film are formed on the first main surface of the strain-detecting semiconductor element.

9. A semiconductor mechanical quantity measuring apparatus according to claim 1,
wherein the wiring board is formed of a polyimide tape having a flexibility.

10. A semiconductor mechanical quantity measuring apparatus according to claim 9,
wherein the wiring board for supporting the strain-detecting semiconductor element is connected to the control board, and the connecting portion thereof is arranged on the main surface of the control board nearest to the object of measurement.

11. A semiconductor mechanical quantity measuring apparatus comprising:
a triple layered structure comprising:
a strain-detecting semiconductor element having a first main surface coupled to an object of measurement and a second main surface constituting the reverse surface opposite to the first main surface;
a first elastic member coupled to the second main surface of the strain-detecting semiconductor element and
a wiring board coupled to the reverse surface of the first elastic member coupled to the second main surface of the strain-detecting semiconductor;
wherein the first elastic member and the wiring board are stacked on one another with the first elastic member sandwiched between the semiconductor element and the wiring board,
a resin member having a larger elastic modulus than the first elastic member and connecting at least a part of the ends of the joint between the strain-detecting semiconductor element and the first elastic member, and
wherein a bending rigidity of the triple layered structure is greater than a bending rigidity of the semiconductor element to thereby decrease the likelihood of breakage of the semiconductor element due to bending.

12. A semiconductor mechanical quantity measuring apparatus according to claim 1, comprising:
a strain measurement unit arranged in a central portion of the strain-detecting semiconductor element.

13. A semiconductor mechanical quantity measuring apparatus according to claim 11, comprising:
a strain measurement unit arranged in a central portion of the strain-detecting semiconductor element.

14. A semiconductor mechanical quantity measuring apparatus for detecting the strain of an object of measurement by coupling a first main surface of a strain-detecting semiconductor element to the object, comprising:
a flexible wiring board on which the strain-detecting semiconductor element is supported; and
means for reducing strain between the strain-detecting semiconductor element and the flexible wiring board without affecting the accuracy of the strain measured by the strain-detecting semiconductor element, said means comprising forming the semiconductor element, the first elastic member and the wiring board as a triple layered structure with the semiconductor element, the first elastic member and the wiring board stacked on one another with the first elastic member sandwiched between the semiconductor element and the wiring board, and providing a strain measurement unit in a central portion of the strain-detecting semiconductor element, providing a first elastic member on a second main surface of the strain-detecting semiconductor element, and providing a resin at least at a part of the end portions of a joint between the strain-detecting semiconductor element and the first elastic member, wherein the first elastic member is lower in elastic modulus than the resin and
wherein a bending rigidity of the triple layered structure is greater than a bending rigidity of the semiconductor element to thereby decrease the likelihood of breakage of the semiconductor element due to bending.

15. A semiconductor mechanical quantity measuring apparatus according to claim 14, further comprising a case coupled to the object of measurement, and a second elastic member interposed between the case and the second main surface of the strain-detecting semiconductor element.

* * * * *